B. F. SHELABARGER.
Car-Wheel and Lubricator.
No. 198,819.  Patented Jan. 1, 1878.
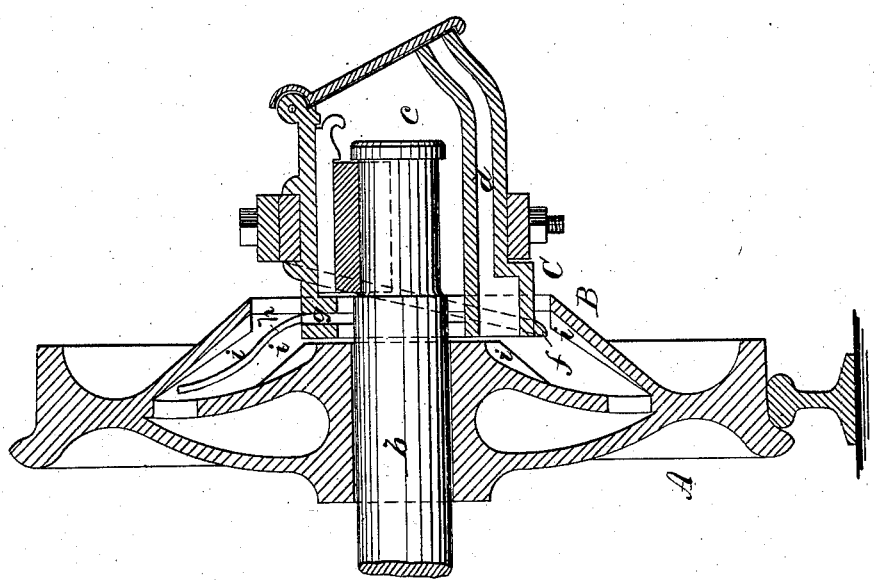
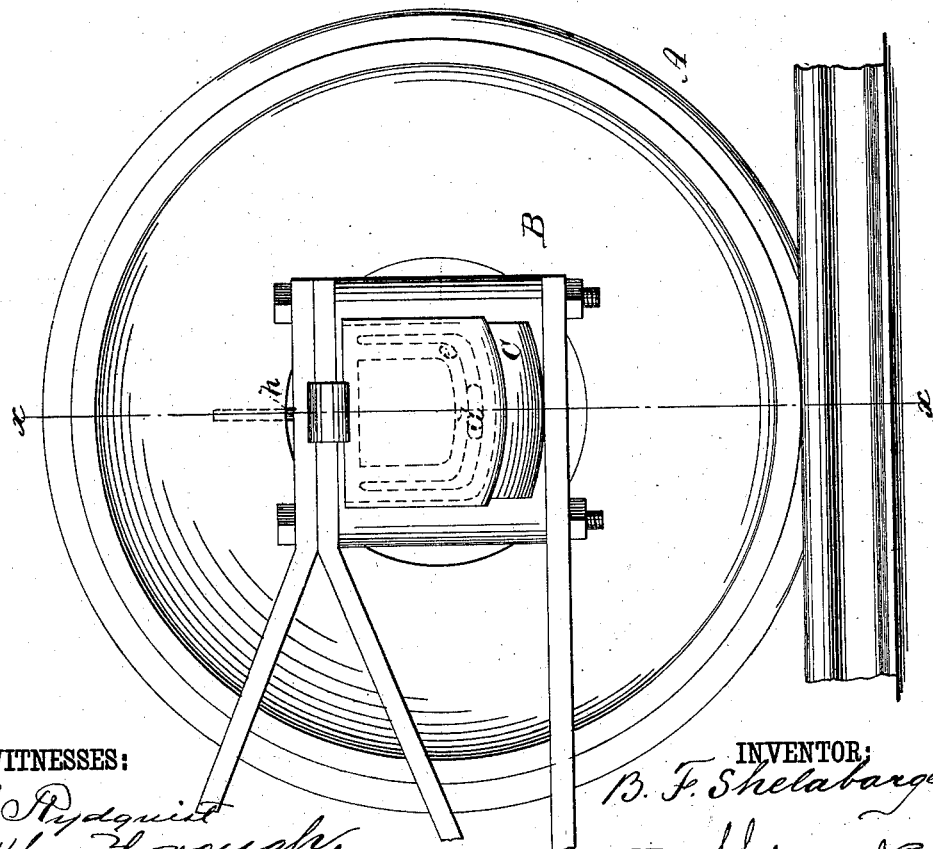

UNITED STATES PATENT OFFICE.

BENJAMIN F. SHELABARGER, OF HANNIBAL, MISSOURI.

IMPROVEMENT IN CAR-WHEELS AND LUBRICATORS.

Specification forming part of Letters Patent No. 198,819, dated January 1, 1878; application filed September 29, 1877.

*To all whom it may concern:*

Be it known that I, BENJAMIN F. SHELABARGER, of Hannibal, in the county of Marion and State of Missouri, have invented a new and Improved Safety Car-Wheel and Axle-Lubricating Device, of which the following is a specification:

Referring to the accompanying drawings, forming part of this specification, Figure 1 is a side elevation of my improved car-wheel and lubricator, and Fig. 2 is a vertical section on line $x\ x$ in Fig. 1.

Similar letters of reference indicate corresponding parts.

My invention relates to improvements in car-wheels and car-axle boxes, whereby the axle is continuously lubricated, and the car is supported in case of the breakage of the axle.

The invention consists in the construction and combination of parts, which will be hereinafter more fully described, and then pointed out in the claims.

In the drawings, A is a car-wheel, secured to the axle $b$, and having formed on its face a conical or converging flange, B, which projects from the face of the wheel a short distance over the axle-box C. The under surface of the axle-box C is convex, being formed on the same curve as the inner edge of the flange B, so that should the axle break the car will be supported by the engagement of the under surface of the box with the flange B.

The box C is supported by the truck-frame in the usual way, and is provided with an oil-chamber, $c$, for receiving waste and oil. A passage, $d$, is formed in the box C, under the chamber $c$, for receiving oil from channels $e$ formed around the front opening of the chamber $c$, for gathering oil that may be thrown out by the jarring of the truck, and conveying it to the chamber in the wheel inclosed by the flange B.

A flange, $f$, is formed around the inner end of the box C, and is inclined so that the portion which extends across the top of the box is outside of the flange B, while the lower portion is inside of the said flange. The face of the flange $f$ that looks toward the wheel is grooved, so as to convey any oil that may fall on the outside of the box to the annular chamber inclosed by the flange B.

An aperture, $g$, is formed in the top of the box C, just inside of the flange B, for receiving the oil from the cavity of the wheel. A rod, $h$, extends from the middle of the said aperture to the outer portion of the chamber inclosed by the flange B, to catch the oil contained by the chamber when it is thrown outward by centrifugal action, and convey it to the aperture $g$.

The inner surface of the flange B and the surface of the web of the wheel are provided with radial ribs $i$, for guiding the oil toward the box C and toward the axle.

It will be seen that by means of this device the axle is continuously lubricated, and the oil is prevented from being lost as it escapes from the axle. It will also be observed that the car will be supported by the flange B in case of the breakage of an axle.

Having thus described my invention, I claim as new and desire to secure by Letters Patent—

1. The box C, having the grooved flange $f$ and aperture $g$, in combination with the wheel A, having the flange B, substantially as shown and described.

2. The box C, having the channel $e$ and passage $d$ formed in it, substantially as and for the purpose herein shown and described.

3. The rod $h$, in combination with the box C, having the aperture $g$, substantially as and for the purpose described.

4. The radial ribs $i$, formed on the inner surface of the flange B and upon the web of the wheel A, substantially as and for the purpose herein shown and described.

BENJAMIN F. SHELABARGER.

Witnesses:
J. L. ROBARDS,
A. J. SETTLES.